United States Patent [19]

Morita et al.

[11] Patent Number: 4,935,914
[45] Date of Patent: Jun. 19, 1990

[54] OPTICAL RECORDING AND REPRODUCING APPARATUS FOR VERIFYING CORRECT WRITING OF INFORMATION SIGNAL

[75] Inventors: Tsutomu Morita, Mitaka; Makoto Shouji, Akikawa; Hiroshi Tsuyuguchi, Tokyo, all of Japan

[73] Assignee: TEAC Corporation, Japan

[21] Appl. No.: 209,838

[22] Filed: Jun. 22, 1988

[30] Foreign Application Priority Data

Jun. 25, 1987 [JP] Japan ................................ 62-158450

[51] Int. Cl.⁵ .............................................. G11B 7/00
[52] U.S. Cl. ........................................ 369/54; 369/116
[58] Field of Search ................................. 369/53-58, 369/112, 116, 121, 100; 360/53; 346/76 L

[56] References Cited

U.S. PATENT DOCUMENTS

| | | | |
|---|---|---|---|
| 4,516,235 | 5/1985 | Tarzaiski | 369/116 |
| 4,599,717 | 7/1986 | Bracht et al. | 369/54 |
| 4,695,994 | 9/1987 | Steenbergen et al. | 369/54 |

Primary Examiner—Robert L. Richardson
Attorney, Agent, or Firm—Andrus, Sceales, Starke & Sawall

[57] ABSTRACT

An optical recording and reproducing apparatus includes a controlling circuit for controlling a light intensity of a laser beam emitted by a laser diode. The controlling circuit sets the light intensity in a verifying mode at a level lower than those in data read and write modes. The verifying mode is a mode for verifying whether or not the recording or reproducing apparatus can operate correctly. The apparatus also comprises a verifying circuit for comparing the reproduced information signal obtained in the verifying mode with a reference information signal which corresponds to the information signal written into the optical disc.

9 Claims, 3 Drawing Sheets

FIG. 1
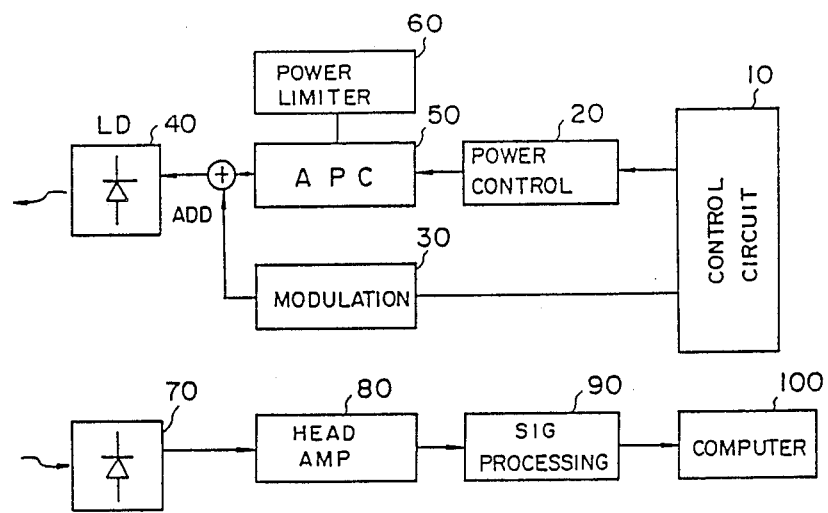
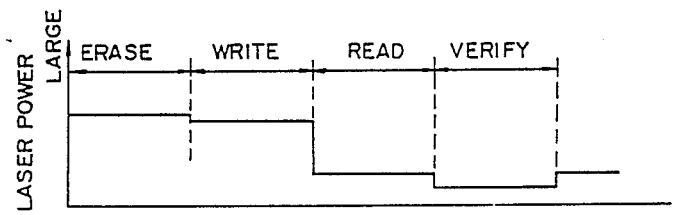
FIG. 4A
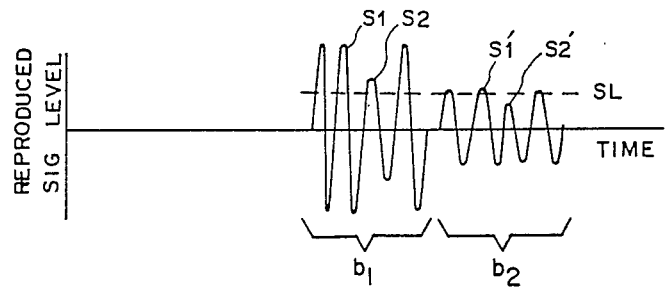
FIG. 4B

OPTICAL RECORDING AND REPRODUCING APPARATUS FOR VERIFYING CORRECT WRITING OF INFORMATION SIGNAL

BACKGROUND OF THE INVENTION

The present invention generally relates to an optical recording and reproducing apparatus, and in particular to an optical recording and reproducing apparatus having a function of verifying whether or not a information signal is correctly written into an optical recording medium such as an optical disc.

Conventionally, a floppy disc apparatus has a function of verifying whether or not data is correctly written into a floppy disc. At the time of the verify test, digital data is written into the floppy disc and also into a memory provided in the floppy disc apparatus. Then the written data is reproduced from the floppy disc and is then compared with data read out from the memory. If both the data are identical to each other, it can be determined that the floppy disc apparatus operates correctly. On the other hand if both the data are different from each other, it is determined that the apparatus does not operate correctly. In this manner, a high-reliability can be secured.

However, conventional optical recording and reproducing apparatuses do not have such a verifying function. Therefore, it cannot be easily determined whether or not the optical recording and reproducing apparatus can operate correctly.

SUMMARY OF THE INVENTION

Accordingly, a general object of the present invention is to provide a novel and useful optical recording and reproducing apparatus in which the above disadvantage has been eliminated.

A more specific object of the present invention is to provide an optical recording and reproducing apparatus which has a function of verifying whether or not the apparatus can operate correctly.

The above objects of the present invention can be achieved by an optical recording and reproducing apparatus comprising the following elements. A laser diode projects a laser beam onto an optical disc. A recording circuit supplies the laser diode with an information signal to be written into the optical disc. A controlling circuit controls a light intensity of the emitted laser beam. The controlling circuits sets the light intensity in a verifying mode at a level lower than those in data write and read modes, the verifying mode being a mode for verifying whether or not the recording or reproducing apparatus can operate correctly. A reproducing circuit reproduces the recorded information signal from the optical disc. A verifying circuit compares the reproduced information signal obtained in the verifying mode with a reference information signal which corresponds to the information signal written into the optical disc.

Other objects, features and advantages of the present invention will become apparent from the following description when read in conjunction with the accompanying drawings.

BRIEF DESCRIPTION OF THE DRAWINGS

FIG. 1 is a schematic block diagram preferred embodiment of the present invention;

FIGS. 4A and 4B are views for explaining an operation of the embodiment of the present invention.

DETAILED DESCRIPTION

Figure 2:
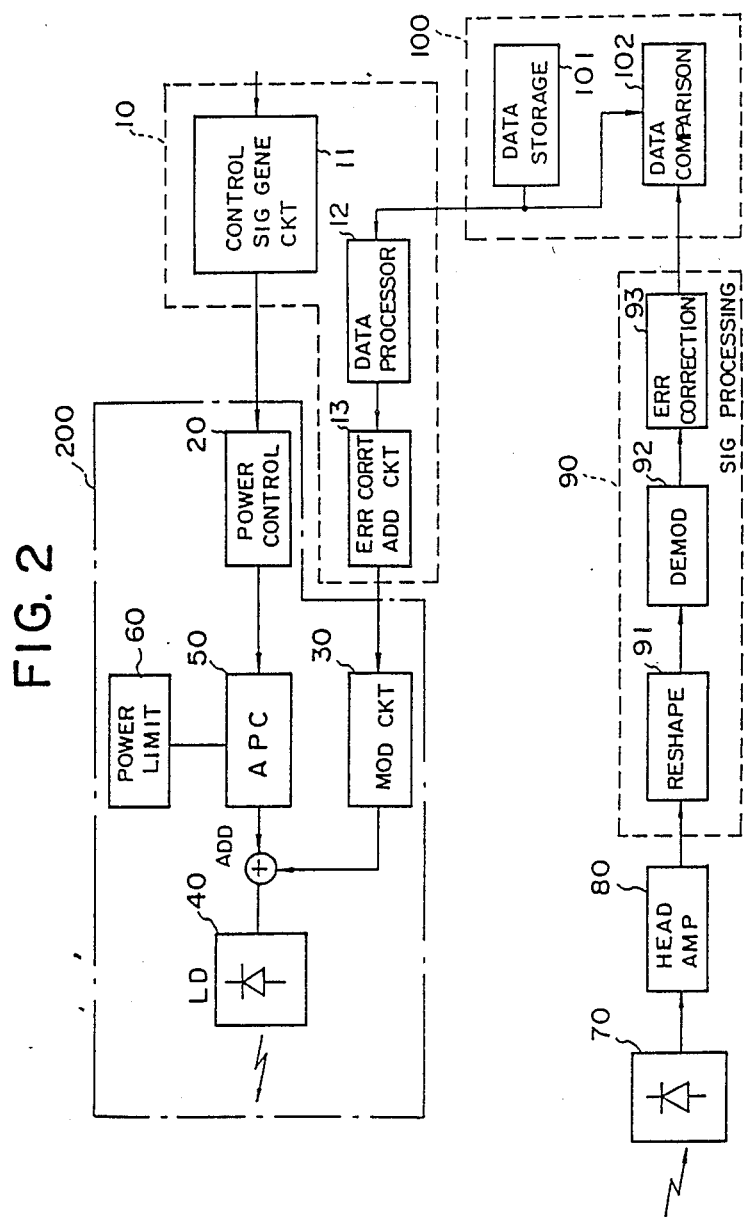
FIG. 2 is a detailed block diagram of the preferred embodiment shown in FIG. 1.

Referring to FIG. 1, a control circuit 10 generates a control signal which indicates which one of an erase mode, a recording mode (write mode), a reproducing mode (read mode) and a verifying mode is to be selected. The generated control signal is supplied to a power control circuit 20. The power control circuit 20 has a function of controlling power (light intensity) of a laser beam emitted from a laser diode (LD) 40, depending on a level of the control signal supplied from the control circuit 10. The power of the laser beam is determined so as to be decreased in the order of the erase mode, the write mode, the read mode and the verifying mode, as shown in FIG. 4A. It is to be noted that a laser power (light intensity) in the verifying mode is determined so as to be smaller than that in each of the other modes.

The modulation circuit 30 is supplied with write data from a computer 100, and modulates the write data in accordance with a conventional modulation method which is suitable for an optical recording and reproduction. A modulated signal is added to an output signal (a bias signal) of an automatic power control circuit 50 by an adder ADD. The automatic power control circuit (hereafter simply referred to as an APC circuit) 50 has a function of preventing a fluctuation in the laser power arising from a temperature variation. Additionally, a power limiter 60 is provided in order to prevent the bias signal from exceeding a predetermined tolerable signal level. Hence, it becomes possible to prevent the bias signal having an excessive level from being applied to the laser diode 40 and to thereby prevent the laser diode 40 from being destroyed.

In this manner, the laser diode 40 emits the laser beam in response to the signal supplied from the adder ADD. Then the emitted laser beam is projected onto an optical disc (not shown), and optically scans the optical disc.

A reproducing system of the present embodiment is constituted as follows. An optical detector 70 receives the laser beam which is reflected by the optical disc (or passes therethrough). A head amplifier 80 amplifies an output signal of the optical detector 70. An amplified signal is supplied to a signal processing circuit 90, where the amplified signal is subjected to a signal processing including reshaping, demodulation and error correction. An output signal of the signal processing circuit 90, i.e., a reproduced information signal is fed to the computer 100, which includes a data comparing circuit and a data storing circuit described in detail later. The computer 100 also has other functional blocks which are not directly associated with the essential features of the present invention. The computer 100 may be constituted by a microprocessor.

Referring to FIG. 2, the control circuit 10 includes a control signal generating circuit 11, a data processor 12 and an error correction code adding circuit 13. The control signal generating circuit 11 generates the control signal described before, the level of which varies depending on which one of the erase, write, read and verifying modes is selected. The data processor 12 performs a data processing in which the information signal (write data) supplied from the computer 100 is converted into a corresponding signal suitable for the optical recording. The error correction code adding circuit 13 adds an error correction code such as a cyclic redundancy code to the write data. The signal processing circuit 90 includes a reshaping circuit 91, a demodulation circuit 92 and an error correction circuit 93. The computer 100 includes a data storing circuit 101 and a data comparing circuit 102. The information signal to be written in the optical disc is stored in the data storing circuit 101. The data comparing circuit 102 compares the data supplied from the signal processing circuit 90 with the data read out from the data storing circuit 101.

Figure 3:
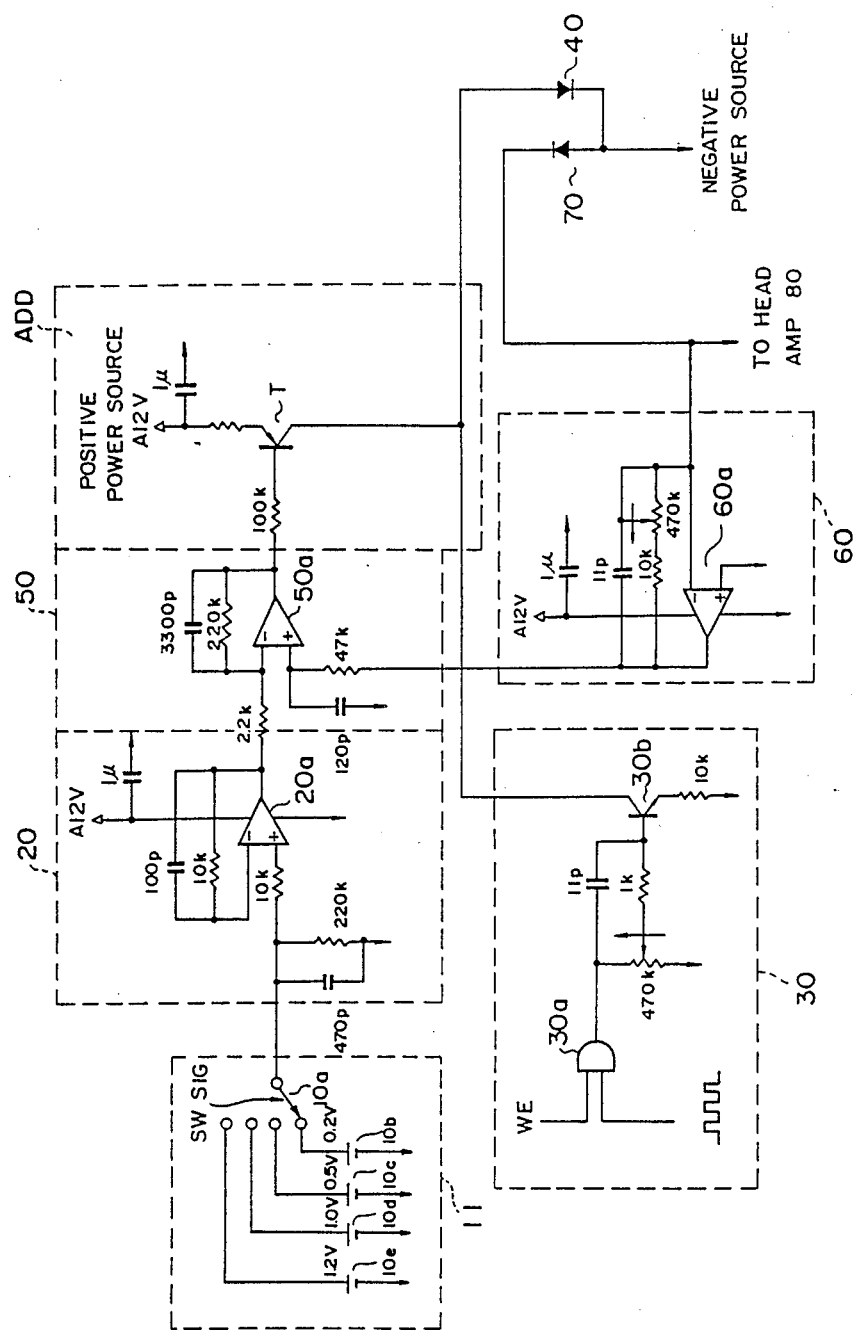
FIG. 3 is a circuit diagram of an essential part of the embodiment shown, in FIGS. 1 and 2.

FIG. 3 shows a detailed circuit showing the control signal generating circuit 11 and a block 200 which includes the power controlling circuit 20, the demodulation circuit 30, the laser diode 40, the APC circuit 50, the power limiter 60 and the adder ADD. The control signal generating circuit 11 is made up of a switch 10a and reference voltage sources 10b, 10c, 10d AND 10e. The switch 10a selects one of the reference voltage sources 10b, 10c, 10d and 10e, depending on which one of the erase, write, read and verifying modes is selected by a switching signal supplied from the computer 100. When the erase mode is selected, the switch 10a selects the reference voltage source 10e having a reference voltage of 1.2 volts. When the write mode is selected, the switch 10a selects the reference voltage source 10d having a reference voltage of 1 volts. When the read mode is selected, the switch 10a selects the reference voltage source 10c having a reference voltage of 0.5 volts. When the verifying mode is selected, the switch 10a selects reference voltage source 10b having a reference voltage of 0.2 volts. The selected reference voltage is supplied to the power control circuit 20. The power control circuit 20 includes an operational amplifier 20a, which amplifies the signal from the control signal generating circuit 11 up to a level depending on the control signal derived from the control circuit 10. The level of the amplified signal is decreased in the order of the erase, write, read and verifying modes.

The modulating circuit 30 includes an AND gate 30a and a transistor 30b. The AND gate 30a is supplied with a write enable signal WE supplied from the computer 100 and is also supplied with write data supplied from the error correction code adding circuit 13 provided in the control circuit 10. The transistor 30b is turned ON or OFF depending on the write data which is applied to the base of the transistor 30b.

The APC circuit 50 includes an operational amplifier 50a. The output signal of the power control circuit 20 is applied to an inverting input terminal of the operational amplifier 50a, and a non-inverting terminal thereof is supplied with an output signal of the power limiter 60. The bias signal to be applied to the laser diode 40 is regulated so as to be set within the tolerance level by the power limiter 60. The bias signal obtained at an output terminal of the operational amplifier 50a is applied to a base of a transistor T which serves as the adder ADD. A collector of the transistor T is supplied with the modulated signal }30 obtained at a collector of the transistor 30b contained in the modulating circuit 30. The potential of the base of the transistor T is determined, depending on the bias signal derived from the APC circuit 50. In other words, the base potential of the transistor T varies, depending on the mode which is selected at the control signal generating circuit 11. Correspondingly, the collector potential of the transistor T also varies, depending on the selected mode. Then the modulated signal is added to the collector potential by the adder ADD, and an added signal is applied, as a finalized signal, to the laser diode 40.

The power limiter 60 includes an operational amplifier 60a. An output signal of the photo detector 70 is supplied to the operational amplifier 60a. An output signal of the operational amplifier 60a is applied to the non-inverting terminal of the operational amplifier 50a of the APC circuit 50.

A description with respect to operations in the erase, write and read modes is omitted, because they are conventional and are not essential features of the present invention. Therefore, a description is now given of an operation in the verifying mode.

First, the switch 10a of the control signal generating circuit 11 shown in FIG. 3 is switched so as to select the reference voltage source 10b with respect to the verifying mode. As described before, the reference voltage source 10b has the smallest reference voltage of 0.2 volts among the reference voltages The selected reference voltage is applied to the power control circuit 20, and is amplified thereby. Then, the amplified signal is applied to the APC circuit 50. Then, the output of the APC circuit 50 is applied to the base of the transistor T of the adder ADD shown in FIG. 3. On the other hand, the write enable signal WE is not applied to the AND gate 30a of the modulation circuit 30 shown in FIG. 3. Therefore the modulation circuit is deactivated. Therefore, the bias signal corresponding to the reference voltage of 0.2 volts is applied to the laser diode 40 as it is. Then the laser beam having a power corresponding to the reference voltage of 0.2 volts is emitted by the laser diode 40, and is projected onto the optical disc. At this time, the laser beam has a power which is set to approximately a half of that in the read mode, for example. In the verifying mode, the laser beam scans a region into which there has been written data which is equivalent to data stored in the data storing circuit 101 of the computer 100.

The laser beam which is reflected by (or passes through) the optical disc is received by the photo detector 70, where the received laser beam is converted to a corresponding electric signal. The converted signal is amplified by the head amplifier 80, and is then subjected to the signal processing by the signal processing circuit 90. Then, the output signal (reproduced signal) of the signal processing circuit 90 is fed to the data comparing circuit 102 of the computer 100. An example of the reproduced signal obtained in the verifying mode is shown in FIG. 4A. In FIG. 4A, a signal indicated by a reference $b_2$ is the reproduced signal supplied from the signal processing circuit 90. A signal indicated by a reference $b_1$ is a signal obtained in the normal read mode. This signal $b_1$ also corresponds to the data signal stored in the data storing circuit 101. As shown, the level of the reproduced signal obtained in the verifying mode is sufficiently lower than that of the reproduced signal obtained in the read mode. Therefore the reproduced signal $b_2$ obtained in the verifying mode has a degraded signal-to-noise ratio, compared with the reproduced signal $b_1$ obtained in the read mode.

On the other hand, the data comparing circuit 102 is supplied, from the data storing circuit 101, with the data signal corresponding to the data from the signal processing circuit 90. Then the data comparing circuit 102 compares the two inputted signals with each other. In the comparing operation, the data comparing circuit 102 extracts a signal portion which exceeds a predetermined slice level SL from each of the inputted signals.

Then the data comparing circuit compares the signal portion extracted from the reproduced signal supplied from the signal processing circuit 90 with the signal portion extracted from the data signal read out the data storing circuit 101. For example, both of a signal portion S1 of the data signal $b_1$ and a corresponding signal portion S1' of the reproduced signal $b_2$ exceed the slice level SL, and therefore it can be found that the data has been correctly written into the optical disc. On the other hand a signal portion S2 of the data signal $b_1$ exceeds the slice level SL, while a corresponding signal portion S2' of the reproduced signal $b_2$ is lower than the slice level SL. Therefore, it can be found that the recording or reproducing does not operate correctly, when both the data signals do not coincide with each other.

It should be particularly appreciated that the light intensity of the laser beam in the verifying mode is set a value smaller than that in the normal read mode. Therefore, the S/N ratio of the reproduced signal obtained in the verifying mode is degraded, as compared with that in the normal read mode. In this manner, it becomes possible to obtain a reproduced signal as if it is obtained under a reproducing condition which is worse (more severe) than that in the normal read mode. As a result, the verifying test described above is reliable, compared to the case where the reproduced signal obtained in the normal read mode is compared with the predetermined data signal.

The present invention is not limited to the embodiment, and variations and modifications may be made without departing from the scope of the present invention.

What is claimed is:

1. An optical recording an reproducing apparatus suitable for use with an optical disc storage medium, said apparatus having write and read modes for recording and reproducing data on and from the disc, said apparatus having a verifying mode for determining the correctness of the operation of the apparatus, said apparatus comprising:
   a laser diode for projecting a laser beam onto the optical disc;
   recording means for supplying the laser diode with an information signal to be written into the optical disc;
   controlling means for controlling a light intensity of the projected laser beam, the controlling means setting the light intensity in the verifying mode at a level lower than those in the data write and read modes;
   reproducing means for reproducing the recorded information signal from the optical disc; and
   verifying means for comparing the reproduced information signal obtained in the verifying mode with a reference information signal which is the same as the information signal written onto the optical disc and for determining whether the reproduced information signal obtained in the verifying mode is the same as the reference information signal, and hence the correctness of the operation of the apparatus.

2. An optical recording and reproducing apparatus as claimed in claim 1, wherein the controlling means comprises control signal generating means for generating a control signal having a voltage level depending on a mode selected from among the data read, write and verifying modes; and adding means for adding the control signal supplied from the control signal generating means to the information signal supplied from the recording means, and wherein an added result is supplied to the laser diode.

3. An optical recording and reproducing apparatus as claimed in claim 2, wherein the control signal generating means comprises a plurality of reference voltage sources each associated with the respective modes, and wherein a reference voltage of the reference voltage source associated with the verifying mode is the smaller than the reference voltages of the other reference voltage sources, and wherein the control signal generating means further comprises a switch for selecting one of the reference voltage sources, depending on the selected mode, the reference voltage of the selected reference source being supplied to the adding means.

4. An optical recording and reproducing apparatus as claimed in claim 3, wherein the controlling means further comprises a power control amplifier for amplifying the selected reference voltage to a level capable of driving the laser diode.

5. An optical recording and reproducing apparatus as claimed in claim 2, wherein the adding means comprises a transistor, a base of which is supplied with the selected reference voltage, and wherein the information signal supplied from the recording means is added to the selected reference voltage at a collector of the transistor.

6. An optical recording and reproducing apparatus as claimed in claim 2, wherein the recording means comprises modulating means for modulating the information signal to be written onto the optical disc, the modulated signal being applied to the adding means.

7. An optical recording and reproducing apparatus as claimed in claim 1, wherein the verifying means comprises data storing means for storing an information signal which is the same as the information signal written onto the optical disc.

8. An optical recording and reproducing apparatus as claimed in claim 1, wherein the verifying means compares a signal portion of the information signal reproduced in the verifying mode with a signal portion of the reference information signal, and wherein the signal portion of each of the information signals has a signal having a level exceeding a predetermined slice level.

9. An optical recording and reproducing apparatus as claimed in claim 1, wherein the modulation means is disabled in the verifying mode.

* * * * *